E. O. ENGLISH & N. WHYTE, dec'd.
R. WHYTE, Admr'x. of N. WHYTE, Dec'd.
PLOWS.
No. 194,231. Patented Aug. 14, 1877.
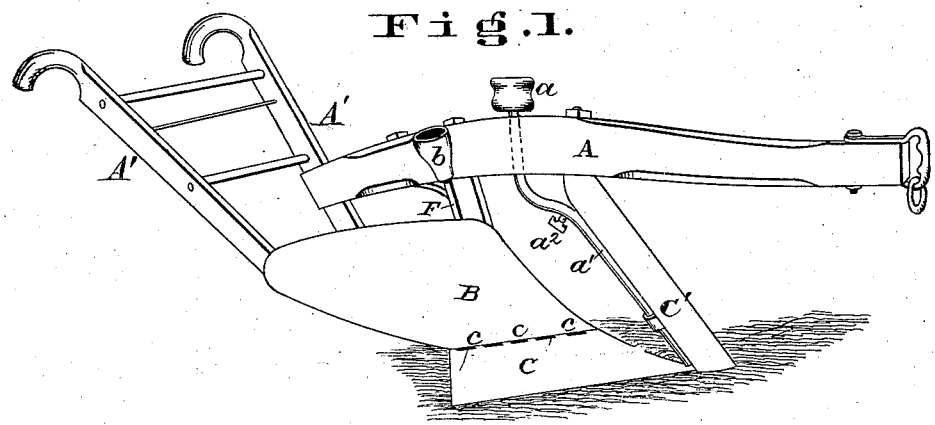
Fig. 1.
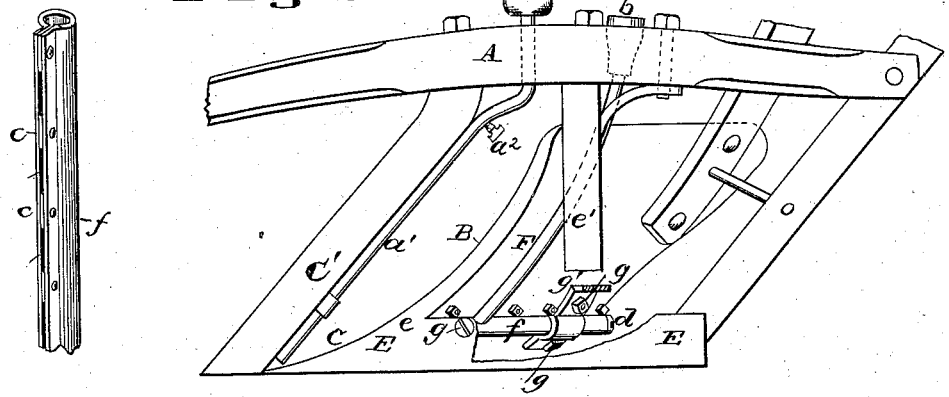
Fig. 5. Fig. 2.
Fig. 3.
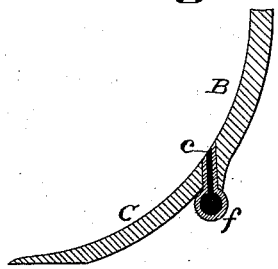
Fig. 4. Fig. 6.
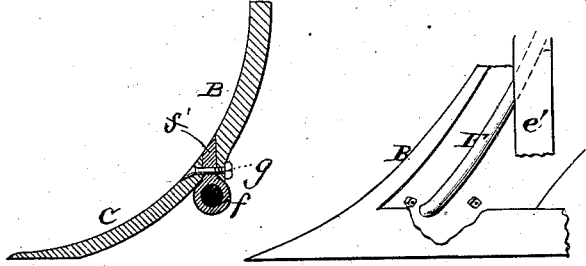
ATTEST.
Ezra O. English
Rosanna Whyte
administratrix of Nicholas Whyte deceased
By James L. Norris.
Attorney.

UNITED STATES PATENT OFFICE.

EZRA O. ENGLISH AND ROSANNA WHYTE, OF ST. LOUIS, MISSOURI, ADMINISTRATRIX OF NICHOLAS WHYTE, DECEASED.

IMPROVEMENT IN PLOWS.

Specification forming part of Letters Patent No. 194,231, dated August 14, 1877; application filed January 11, 1877.

*To all whom it may concern:*

Be it known that EZRA O. ENGLISH, and NICHOLAS WHYTE, (deceased,) of St. Louis, in the county of St. Louis and State of Missouri, did invent certain new and useful Improvements in Plows, of which the following is a specification:

This invention has for its object to furnish an attachment for plows, whereby the same are adapted to efficiently cultivate adhesive soil, or such soil as is termed "waxy land," in which the ordinary plow has been found very unserviceable and objectionable, owing to the soil adhering to the mold-board and preventing the same from being kept clean and polished, and to the absence of sufficient gritty substance or substances in the land.

The invention consists of a tube, of any desired shape, arranged upon the inside of the plow, preferably at the junction of the mold-board and share, and being provided with a series of slots or a single longitudinal slit, opening at the face of the plow, and said tube communicating with a reservoir containing water, oil, or any other suitable lubricating-liquid, whereby the same is supplied to the tube, and oozes or passes out through the slots or slits onto the share and mold-board, and permits adhesive or waxy soil to be effectually turned over and broken up.

The invention further consists in the combination, with the colter which severs the furrow-slice from the land, of a pipe communicating with a reservoir for containing water, oil, or other lubricating-liquid, and terminating at the heel of the colter and point of the plow-share, whereby such lubricating material may be supplied to said heel and point for lubricating said parts and permitting them to glide smoothly and evenly through the soil, cutting the furrow-slice, and, in conjunction with the mold-board, turning and breaking the furrow.

The invention consists of certain other features which will be hereinafter fully set forth.

In the drawing illustrating the invention, Figure 1 represents a perspective view of a plow with the improvements attached; Fig. 2, an elevation looking from the land-side of the plow. Figs. 3 and 4 are detached sectional views of the mold-board and tube, the sectional views of the latter being through one of the slots and through the solid portion between the slots; Fig. 5, a detached view of a modification of the tube, and Fig. 6 another modification.

The letter A represents a plow-beam; A' A', the handles; B, the mold-board, and C the plow-share, and C' the colter of the mold-board and plow-share, whereby the plow is adapted to glide and pass smoothly and evenly through that kind of soil which is termed "waxy land," or which adheres to the plow, and which renders ordinary plows very unserviceable and objectionable, owing to the fact that the mold-board and share cannot be kept clean, bright, and smooth, due to the absence of any gritty constituent in the soil. Such objections are effectually overcome by the device for lubricating the face of the mold-board and shoe, and enables the furrows to be turned and broken up without the liability of the soil clinging or adhering to the plow.

In order to lubricate the colter and the point of the plow-share, there is provided a pipe, $a'$, passing down the rear of the colter and suitably attached thereto, and terminating at its lower end at the heel of the colter and the point of the plow-share, and communicating at its upper end with a reservoir, $a$, and whereby the lubricating material will be supplied, through said pipe $a'$, to the point of the plow-share and heel of the colter, enabling the functions hereinbefore set forth to be effectually accomplished, and enabling the colter to effectually sever the furrow-slice without liability of the soil clinging or adhering to the same. By the means described the mold-board, plow-share, and colter are all kept clean and bright, and the plow is especially adapted for use in land which is adhesive and tenacious, and which is very rich and fertile, but which has heretofore been found very difficult of cultivation for the reasons before stated.

Instead of the flange $f'$ of the feed-tube $f$ being constructed with a series of slots, $c$, it may be constructed with a single longitudinal opening, as represented in Fig. 5, and moreover, instead of the feed-tube having a perforated flange, it may be constructed with an opening or a series of slots directly in it, arranged in coincidence with a slit or a series of slots in the mold-board.

It will be evident that, instead of two distinct reservoirs for the lubricating-liquid, there may be a single one employed, and the pipes $a'$ and F communicate with it, and the reservoir or reservoirs may be located in any desired and suitable position.

The pipes $a'$ and F are provided with suitable stop or cut-off cocks for regulating or entirely cutting off the supply of lubricating material. One end of the tube $f$ is provided with a removable screw or other plug, $d$, for the purpose of introducing a rod or other device for cleansing the interior of the tube, should it become necessary.

Instead of arranging the tube in a horizontal position, it is also intended to arrange the same in a vertical position at the rear of the mold-board, and having its lower open end supply the lubricant into an opening between the mold-board and share, as shown in Fig. 6, and thereby accomplish the same object.

Having thus described this invention, what we claim, and desire to secure by Letters Patent, is—

1. The combination, with a plow, of a perforated tube communicating with the face of the mold-board, and with a reservoir for containing a lubricating material, substantially as described.

2. The combination, with a plow, of the perforated flanged tube $f$, the vertical pipe F, and a suitable lubricating-reservoir, substantially as described.

3. The combination, with the colter and share of a plow, of an attachment for supplying a lubricating material to the heel of the colter and point of the share, substantially as described.

4. The combination, with the colter and share of a plow, of the pipe $a'$, terminating at its lower end at the heel of the colter and point of the share, and a reservoir for containing a lubricating material, with which the upper end of the pipe communicates, substantially as described.

In testimony that we claim the foregoing we have hereunto set our hands in the presence of the subscribing witnesses.

EZRA O. ENGLISH.
ROSANNA WHYTE,
*Administratrix of Nicholas Whyte, deceased.*

Witnesses:
SEXTUS S. BISSELL,
JOSEPH E. WANS.